United States Patent
Imai et al.

(10) Patent No.: US 10,222,286 B2
(45) Date of Patent: Mar. 5, 2019

(54) PRESSURE DETECTING DEVICE HAVING A MOUNTING MECHANISM

(71) Applicant: Surpass Industry Co., Ltd., Saitama (JP)

(72) Inventors: Takashi Imai, Saitama (JP); Masahiro Hasunuma, Saitama (JP); Masamichi Kobayashi, Saitama (JP)

(73) Assignee: SURPASS INDUSTRY CO., LTD., Saitama (JP)

( * ) Notice: Subject to any disclaimer, the term of this patent is extended or adjusted under 35 U.S.C. 154(b) by 317 days.

(21) Appl. No.: 15/183,469

(22) Filed: Jun. 15, 2016

(65) Prior Publication Data

US 2016/0377499 A1    Dec. 29, 2016

(30) Foreign Application Priority Data

Jun. 23, 2015    (JP) ................. 2015-126014

(51) Int. Cl.
  *G01L 19/00*    (2006.01)
  *G01L 19/10*    (2006.01)
  *G01L 19/14*    (2006.01)

(52) U.S. Cl.
  CPC ........ *G01L 19/147* (2013.01); *G01L 19/0023* (2013.01); *G01L 19/10* (2013.01)

(58) Field of Classification Search
  None
  See application file for complete search history.

(56) References Cited

U.S. PATENT DOCUMENTS

| | | | | |
|---|---|---|---|---|
| 4,745,810 A * | 5/1988 | Pierce | ................. | G01L 19/0007 73/706 |
| 5,993,395 A * | 11/1999 | Shulze | ................. | A61B 5/0215 600/486 |
| 6,968,741 B2 * | 11/2005 | Orr | ........................ | A61B 5/087 73/700 |
| 7,021,148 B2 * | 4/2006 | Kuhn | ................. | A61M 1/3639 73/715 |
| 7,225,678 B2 * | 6/2007 | Kandler | ............. | G01L 19/0645 73/715 |
| 7,335,164 B2 * | 2/2008 | Mace | ..................... | A61B 5/083 422/84 |

(Continued)

FOREIGN PATENT DOCUMENTS

JP    2005-207946 A    8/2005

*Primary Examiner* — Peter J Macchiarolo
*Assistant Examiner* — Jermaine L Jenkins
(74) *Attorney, Agent, or Firm* — MH2 Technology Law Group, LLP

(57) ABSTRACT

To improve connectivity with tubes to be connected to an inlet and an outlet of a flow passage, while increasing the rapidity of an operation of changing a fluid to be passed through the flow passage and also increasing the safety. Provided is a pressure detecting device including a pressure detecting unit detecting a pressure transmitted to a diaphragm, a flow passage unit having a diaphragm for transmitting a pressure of a fluid flowing through the flow passage to the diaphragm, and a nut for removably mounting the flow passage unit onto the pressure detecting unit. The nut mounts the flow passage unit onto the pressure detecting unit when a position of a positioning groove of the pressure detecting unit about an axis coincides with a position of a positioning projection of the flow passage unit about an axis.

6 Claims, 18 Drawing Sheets

(56) References Cited

U.S. PATENT DOCUMENTS

| | | | |
|---|---|---|---|
| 9,752,946 B2* | 9/2017 | Hoffman | G01L 19/0681 |
| 2014/0216451 A1* | 8/2014 | Jaffe | A61M 16/0051 |
| | | | 128/202.22 |
| 2015/0160828 A1 | 6/2015 | Wang et al. | |
| 2015/0219514 A1* | 8/2015 | Novellani | G01L 19/0092 |
| | | | 73/714 |

* cited by examiner

PRESSURE DETECTING DEVICE HAVING A MOUNTING MECHANISM

CROSS-REFERENCE TO RELATED APPLICATIONS

This application is based on Japanese Patent Application No. 2015-126014, the contents of which are incorporated herein by reference in its entirety.

TECHNICAL FIELD

The present disclosure relates to a pressure detecting device having a mounting mechanism that removably mounts a flow passage unit onto a pressure detecting unit.

BACKGROUND ART

There is known an in-line type fluid pressure sensor including a body having a flow passage that allows a liquid such as a chemical solution to pass the passage and a sensor body integrated in the body and detecting a fluid pressure transmitted to a fluid pressure receiving surface via a protective sheet (see, Japanese Unexamined Patent Application, Publication No. 2005-207946, for example).

In the pressure sensor disclosed in Japanese Unexamined Patent Application, Publication No. 2005-207946, the sensor body is mounted onto the top surface of the body and then fixed to the body by a sensor holder, and a body cap is attached to the top surface of the body to integrate these members.

SUMMARY

Technical Problem

In the pressure sensor disclosed in Japanese Unexamined Patent Application, Publication No. 2005-207946, the body having a flow passage and the sensor body are integrated with each other. Accordingly, the existing flow passage needs to be washed with pure water or the like for changing a liquid to be detected.

However, a pressure sensor in which the flow passage is washed takes a great deal of time for the washing operation, and also cannot completely remove the liquid remaining in the flow passage.

Thus, the pressure sensor in which the flow passage is washed for changing a liquid is not sufficiently rapid nor safe in some applications like the medical field where the flow passage is required to be completely sanitized by sterilization or the like.

The present disclosure has been made in view of the above circumstances, and an object thereof is to provide a pressure detecting device that improves connectivity with tubes to be connected to an inlet and an outlet of a flow passage, while increasing the rapidity of an operation of changing a fluid to be passed through the flow passage and also increasing the safety.

Solution to Problem

In order to solve the foregoing problem, the following solutions have been adopted in the present disclosure.

A pressure detecting device according to an aspect of the present disclosure includes a pressure detecting unit configured to detect a pressure transmitted to a pressure detecting surface, a flow passage unit including a flow passage allowing a fluid to be passed therethrough along a flow direction, from an inlet to an outlet and a pressure transmitting surface for transmitting a pressure of the fluid flowing through the flow passage, to the pressure detecting surface, and a mounting mechanism configured to removably mount the flow passage unit onto the pressure detecting unit. The pressure detecting unit includes a first positioning portion extending in a first axis direction along a first axis orthogonal to the pressure detecting surface, the flow passage unit includes a second positioning portion extending in a second axis direction along a second axis orthogonal to the pressure transmitting surface, and the mounting mechanism mounts the flow passage unit onto the pressure detecting unit when the first axis coincides with the second axis and a position of the first positioning portion about the first axis coincides with a position of the second positioning portion about the second axis.

According to the pressure detecting device of an aspect of the present disclosure, the flow passage unit is removably mounted on the pressure detecting unit. Thus, in changing a fluid to be passed through the flow passage, a used flow passage unit can be removed from the pressure detecting unit for mounting an unused flow passage unit on the pressure detecting unit anew.

The removability of the flow passage unit eliminates, in changing a fluid to be passed through the flow passage, the need for the washing of the passage, which takes a great deal of time. This can increase the rapidity of the operation. In addition, the use of the unused flow passage unit increases the safety.

The mounting mechanism mounts the flow passage unit onto the pressure detecting unit when the first axis coincides with the second axis and the position of the first positioning portion of the pressure detecting unit about the first axis coincides with the position of the second positioning portion of the flow passage unit about the second axis. Accordingly, the flow passage unit is arranged in a predetermined orientation about the second axis relative to the orientation of the pressure detecting unit about the first axis.

In this way, the inlet and the outlet of the flow passage formed in the flow passage unit are arranged at the predetermined positions relative to the pressure detecting unit, thereby increasing connectivity with a tube to be connected to the inlet and a tube to be connected to the outlet.

Thus, according to a pressure detecting device in accordance with an aspect of the present disclosure, there is provided a pressure detecting device that improves connectivity with tubes to be connected to the inlet and the outlet of the flow passage, while increasing the rapidity of the operation of changing a fluid to be passed through the flow passage and also increasing the safety.

The pressure detecting device according to an aspect of the present disclosure may be configured such that the pressure detecting unit includes a recess that has the pressure detecting surface arranged at a bottom thereof and the first positioning portion formed on an inner circumferential surface thereof, the flow passage unit includes a protrusion that has the pressure transmitting surface arranged at a top thereof and the second positioning portion formed on an outer circumferential surface thereof, and the mounting mechanism mounts the flow passage unit onto the pressure detecting unit, with the protrusion of the flow passage unit fitted inside the recess of the pressure detecting unit.

In this way, the arrangement of the pressure detecting surface at the bottom of the recess of the pressure detecting unit inhibits the operator from accidentally touching the pressure detecting surface in replacing the flow passage unit or inhibits the pressure detecting surface from undesirably contacting with other members to be damaged.

The pressure detecting device with the above configuration may be such that the first positioning portion includes a plurality of grooves formed on the inner circumferential surface of the recess, the second positioning portion includes a plurality of projections formed on the outer circumferential surface of the protrusion, and the mounting mechanism mounts the flow passage unit onto the pressure detecting unit when the first axis coincides with the second axis and positions of the plurality of grooves about the first axis respectively coincide with positions of the plurality of projections about the second axis.

In this way, when the positions, about the first axis, of the plurality of grooves formed on the inner circumferential surface of the recess of the pressure detecting unit do not coincide with the positions, about the second axis, of the plurality of projections formed on the protrusion of the flow passage unit, the flow passage unit is prevented from being mounted onto the pressure detecting unit. This prevents incorrect placement of a flow passage unit on a pressure detecting unit that does not correspond to the flow passage unit in a situation where, for example, a plurality of flow passage units are mounted onto their respective pressure detecting units.

The pressure detecting device according to an aspect of the present disclosure may be configured such that the mounting mechanism is a nut that is mounted on the pressure detecting unit such that the mounting mechanism is rotatable about the first axis and has internal threads on an inner circumferential surface thereof, the flow passage unit has external threads on an outer circumferential surface that is outward of an outer periphery of the protrusion, and the pressure transmitting surface is brought into contact with the pressure detecting surface by fastening the internal threads formed on the nut to the external threads.

In this way, as the operator rotates the nut mounted on the pressure detecting unit about the first axis, the pressure detecting surface of the pressure detecting unit and the pressure transmitting surface of the flow passage unit are brought closer to each other, and finally, into contact with each other. With the relatively simple operation of rotating the nut about the first axis, the space between the pressure detecting surface and the pressure transmitting surface can be gradually narrowed and then these surfaces are reliably brought into contact with each other. This brings the pressure detecting surface and the pressure transmitting surface into contact relatively easily and will not strongly bring these surfaces into contact with each other to damage the surfaces.

In the pressure detecting device with the above configuration, a distal end of the internal threads in the first axis direction may be in contact with a distal end of the external threads in the second axis direction when a part of a length of the first positioning portion in the first axis direction engages a part of a length of the second positioning portion in the second axis direction.

In this way, the flow passage unit is positioned such that it is arranged in the predetermined orientation about the second axis relative to the orientation of the pressure detecting unit about the first axis, before the nut is rotated about the first axis to mount the flow passage unit onto the pressure detecting unit.

As a result, the flow passage unit can be easily mounted onto the pressure detecting unit compared with the case where the first positioning portion starts to engage the second positioning portion simultaneously with or subsequently to the fastening of the nut to the flow passage unit.

Advantageous Effects

According to the present disclosure, there is provided a pressure detecting device that improves connectivity with tubes to be connected to the inlet and the outlet of the flow passage, while increasing the rapidity of the operation of changing a fluid to be passed through the flow passage and also increasing the safety.

DESCRIPTION OF EMBODIMENTS

First Embodiment

Hereinafter, a pressure detecting device 100 according to a first embodiment of the present disclosure will be described based on the drawings.

Figure 1:
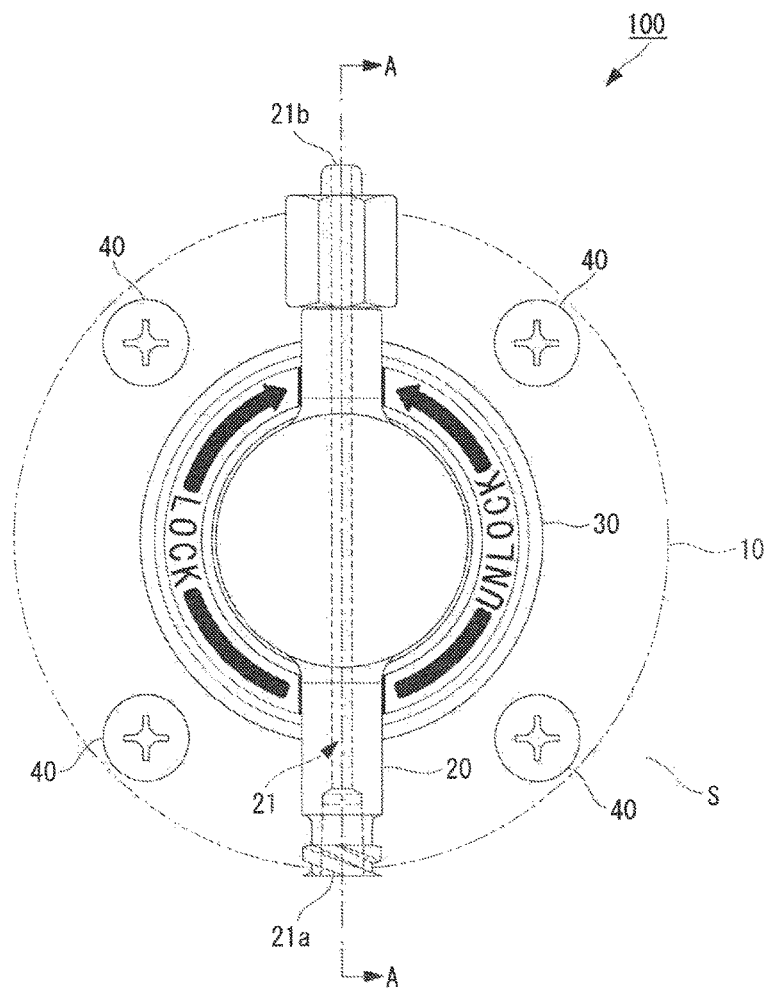
FIG. 1 is a front view of a pressure detecting device according to a first embodiment.
Figure 2:
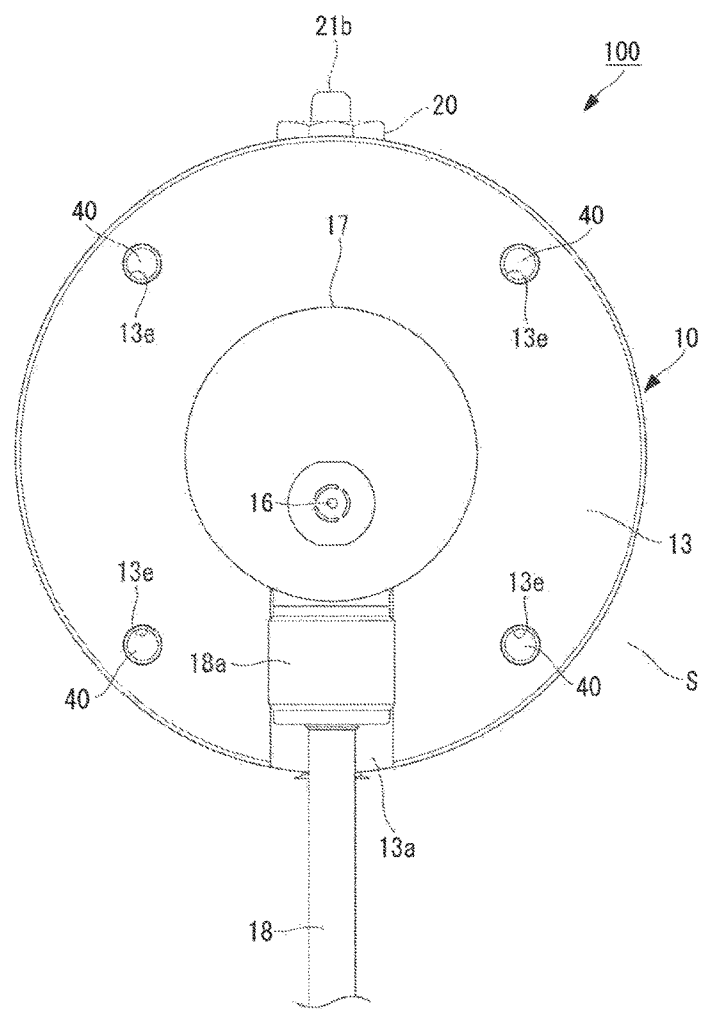
FIG. 2 is a back view of the pressure detecting device according to the first embodiment.

As shown in a front view of FIG. 1 and a back view of FIG. 2, the pressure detecting device 100 of the embodiment includes a pressure detecting unit 10 mounted on an installation plate S by fastening bolts 40, a flow passage unit 20 having inside a flow passage 21 that allows a fluid to be passed through along a linear flow direction, from an inlet 21a to an outlet 21b, and a nut 30 (a mounting mechanism) that removably mounts the flow passage unit 20 onto the pressure detecting unit 10.

Figure 4:
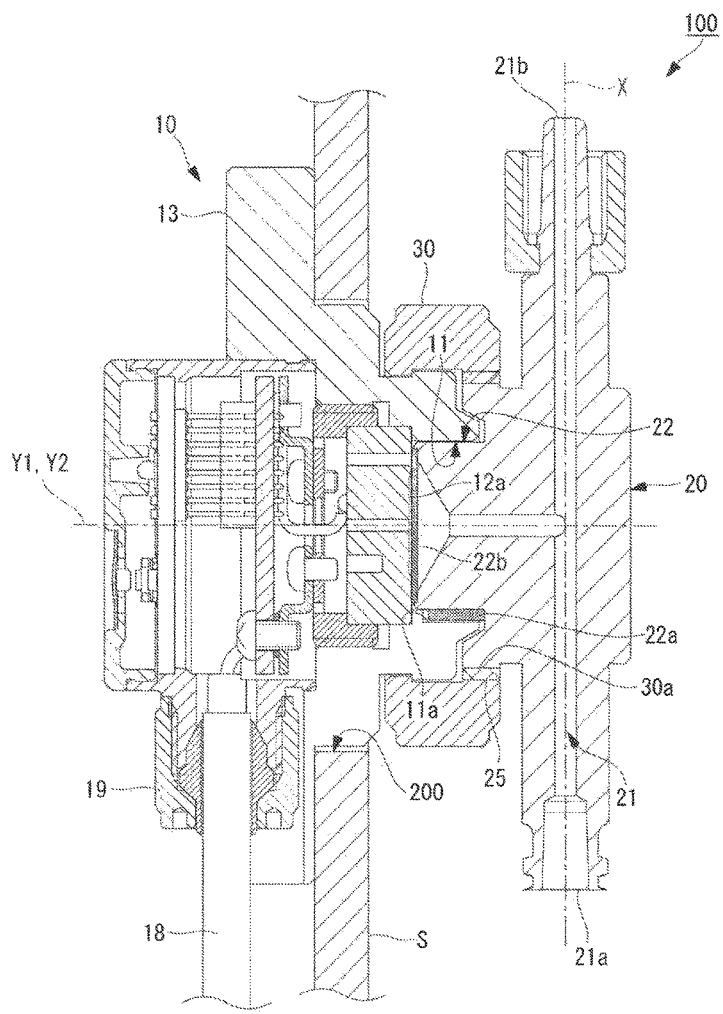
FIG. 4 is a cross-sectional view of the pressure detecting device shown in FIG. 1 taken along the line A-A.

As shown in FIG. 4 (a cross-sectional view of the pressure detecting device 100 shown in FIG. 1 taken along the line A-A), the pressure detecting unit 10 is mounted on the installation plate S, and the flow passage unit 20 is mounted on the pressure detecting unit 10 by the nut 30. The pressure detecting device 100 is mounted on the installation plate S with the flow passage unit 20 mounted on and integrated with the pressure detecting unit 10 by the nut 30.

The inlet 21a of the flow passage unit 20 receives an inlet-side tube (not shown) that allows fluid to enter the inlet 21a, and the outlet 21b of the flow passage unit 20 receives an outlet-side tube (not shown) that allows fluid from the outlet 21b to pass through. The pressure of the fluid passing through the flow passage 21 from the inlet 21a to the outlet 21b is detected by the pressure detecting unit 10.

Here, the fluid may be blood or liquid, such as dialysate.

Figure 3:
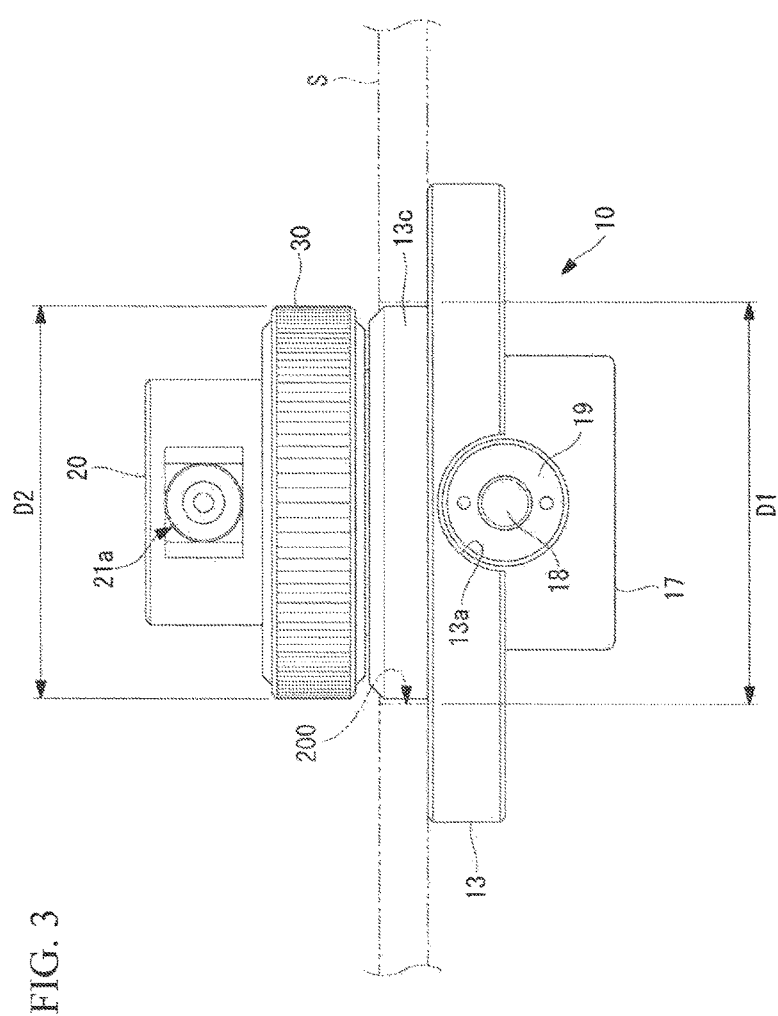
FIG. 3 is a bottom view of the pressure detecting device according to the first embodiment.

As shown in a bottom view of FIG. 3, the pressure detecting unit 10 includes a main body portion 13 to be mounted onto the installation plate S. The installation plate S has a mounting hole 200 that is circular when viewed in a plan view, and a reduced diameter portion 13c that is provided at the main body portion 13 and is circular when viewed in a plan view is fitted inside the mounting hole 200.

As shown in FIG. 3, an inner diameter of the mounting hole 200 is D1 and an outer diameter of the nut 30 and the reduced diameter portion 13c is D2. The diameters D1 and D2 have a relationship of D1>D2. Accordingly, the pressure detecting device 100 of the embodiment can be inserted through the mounting hole 200 of the installation plate S with the nut 30 mounted on the pressure detecting unit 10.

With the pressure detecting device 100 fitted inside the mounting hole 200 of the installation plate S, the fastening bolts 40 are inserted into through-holes (not shown) formed at four locations of the installation plate S to be fastened to fastening holes 13e (refer to FIG. 2) formed in the main body portion 13. Thus, the pressure detecting unit 10 of the pressure detecting device 100 is mounted onto the installation plate S.

The flow passage unit 20 is not yet mounted on the pressure detecting unit 10 at the time of mounting the pressure detecting unit 10 to the installation plate S. The flow passage unit 20 is mounted to the pressure detecting unit 10 after the pressure detecting unit 10 is mounted to the installation plate S.

As shown in FIGS. 2 and 3, the pressure detecting unit 10 is configured such that a cable 18 that electrically connects a pressure sensor 12 arranged inside the pressure detecting unit 10 to an external controller (not shown) is attached to a housing 17 via a cable attaching nut 18a.

As shown in FIGS. 2 and 3, the main body portion 13 has a cable accommodating groove 13a in which the cable attaching nut 18a is accommodated.

Thus, even when the cable attaching nut 18a tries to move as an external force is applied to the cable 18, the cable accommodating groove 13a restricts the movement of the cable attaching nut 18a. This inhibits damage to the pressure detecting unit 10 caused by the external force applied to the cable 18.

Next, the pressure detecting unit 10 will be described in detail referring to FIG. 5 (a vertical cross-sectional view of the pressure detecting unit 10 in FIG. 4). The pressure detecting unit 10 shown in FIG. 5 detects a pressure transmitted to a diaphragm 12a.

Figure 5:
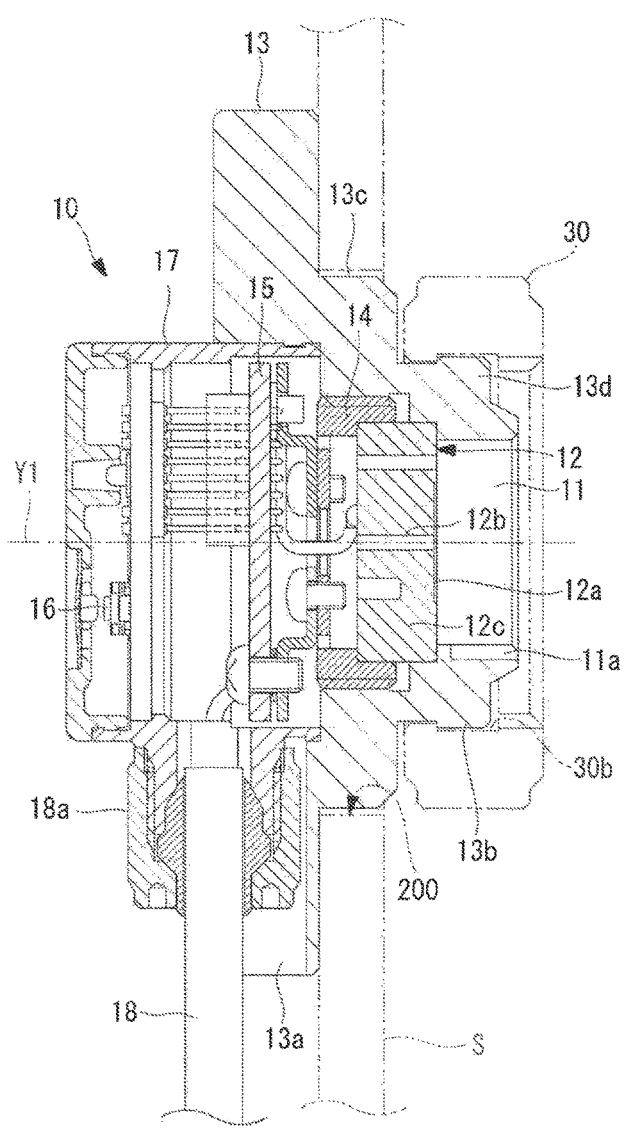
FIG. 5 is a vertical cross-sectional view of the pressure detecting unit shown in FIG. 4.

As shown in FIG. 5, the pressure detecting unit 10 includes the main body portion 13 having the reduced diameter portion 13c to be fitted inside the mounting hole 200 of the installation plate S, the pressure sensor 12 arranged inside the main body portion 13, a sensor retaining portion 14 retaining the pressure sensor 12 such that the pressure sensor 12 is arranged within the main body portion 13, a sensor substrate 15 for transmitting power and an electrical signal to and from the pressure sensor 12 and the cable 18, a zero point adjustment switch 16 for making a zero point adjustment of the pressure sensor 12, and the housing 17 accommodating the sensor substrate 15.

The pressure sensor 12 includes the diaphragm 12a (a pressure detecting surface) that is made of a corrosion-resistant material (e.g., sapphire) and formed in a thin film, a strain sensitive resistor (not shown) affixed to the diaphragm 12a, and a base portion 12c retaining the diaphragm 12a.

The pressure sensor 12 is a strain type sensor that outputs a pressure signal in response to a change in the strain sensitive resistor, which is deformed with the diaphragm 12a in accordance with the transmitted pressure. The base portion 12c has a through hole 12b that is in communication with the diaphragm 12a, and one surface of the diaphragm 12a is maintained at atmospheric pressure. Thus, the pressure sensor 12 detects a gauge pressure based on atmospheric pressure.

The sensor retaining portion 14 is formed in a cylindrical shape around an axis Y1 (a first axis) and carries external threads on its outer circumferential surface. The external threads on the outer circumferential surface of the sensor retaining portion 14 are fastened to internal threads formed on an inner circumferential surface of the reduced diameter portion 13c of the main body portion 13 that has the pressure sensor 12 arranged on the inner side of a front end portion 13d of the main body portion 13. In this way, the sensor retaining portion 14 retains the pressure sensor 12 within the main body portion 13.

The sensor substrate 15 includes, for example, an amplifier circuit (not shown) that amplifies the pressure signal from the pressure sensor 12, an interface circuit that transmits the pressure signal amplified by the amplifier circuit to a pressure signal line (not shown) of the cable 18, a power supply circuit (not shown) that conducts supply voltage externally supplied through the cable 18 to the pressure sensor 12, and a zero point adjustment circuit (not shown) that makes an zero point adjustment when the zero point adjustment switch 16 is pressed.

The zero point adjustment circuit makes an adjustment so that, when the zero point adjustment switch 16 is pressed, the pressure signal output by the pressure sensor 12 at that point is set as an initial value (zero).

As shown in FIG. 5, the pressure detecting unit 10 has a recess 11 at the front end portion 13d of the main body portion 13 and the diaphragm 12a is arranged at the bottom of the recess 11. The recess 11 has on its inner circumferential surface a positioning groove 11a (a first positioning portion) extending in a first axis direction along the axis Y1.

As shown in FIG. 5, the diaphragm 12a is arranged on a plane orthogonal to the axis Y1. Accordingly, the positioning groove 11a is formed on the inner circumferential surface of the recess 11 such that the positioning groove 11a extends in the first axis direction along the axis Y1, which is orthogonal to the diaphragm 12a.

Figure 6:
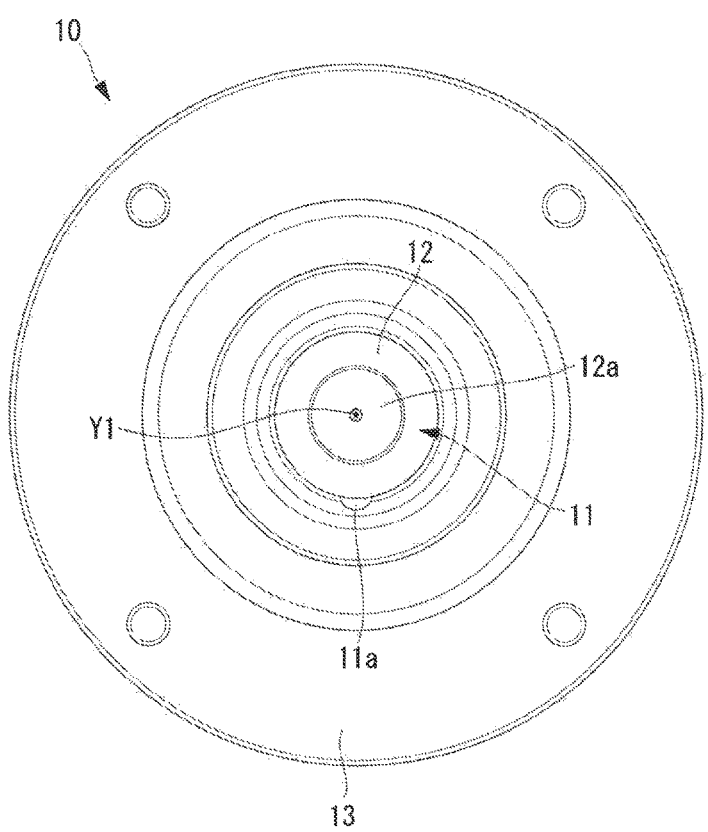
FIG. 6 is a front view of the pressure detecting unit shown in FIG. 5.

FIG. 6 is a front view of the pressure detecting unit 10 in FIG. 5 and shows the pressure detecting unit 10 as seen from the right in FIG. 5.

As shown in FIG. 6, the positioning groove 11a on the inner circumferential surface of the recess 11 is formed at only one location about the axis Y1.

As shown in FIG. 6, when the pressure detecting unit 10 has no flow passage unit 20 attached thereto, the diaphragm 12a of the pressure sensor 12 is exposed to the outside. It is to be noted that the diaphragm 12a is arranged at the bottom of the recess 11, and thus there is less risk that an operator will touch the diaphragm 12a.

As shown in FIG. 5, the main body portion 13 has on an outer circumferential surface of the front end portion 13d an endless annular protruding portion 13b extending around the axis Y1. At the same time, the nut 30 has on its inner circumferential surface an endless annular groove portion 30b extending around the axis Y1, as shown in FIG. 7.

The nut 30 is made of an elastically deformable material (e.g., a resin material) and the annular groove portion 30b becomes engaged with the annular protruding portion 13b as the nut 30 is forced from the front end portion 13d to the reduced diameter portion 13c.

As shown in FIG. 5, with the annular groove portion 30b engaged with the annular protruding portion 13b, there is a slight gap between an outer circumferential surface of the annular protruding portion 13b and an inner circumferential surface of the annular groove portion 30b. Thus, the nut 30 is rotatable about the axis Y1 relative to the main body portion 13 while it remains mounted on the pressure detecting unit 10. This allows the operator to rotate the nut 30 about the axis Y1, with the pressure detecting unit 10 secured to the installation plate S.

Figure 7:
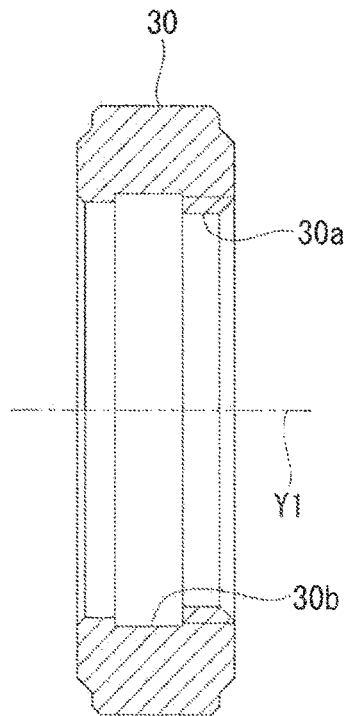
FIG. 7 is a vertical cross-sectional view of a nut shown in FIG. 4.

As shown in FIG. 7, the nut 30 is a ring shaped member and has on its inner circumferential surface internal threads 30a extending around the axis Y1. The nut 30 removably mounts the flow passage unit 20 onto the pressure detecting unit 10 by fastening and unfastening the internal threads 30a to and from external threads 25 of the flow passage unit 20.

Next, the flow passage unit 20 will be described in detail with reference to FIG. 8 (a vertical cross-sectional view of the flow passage unit 20 in FIG. 4).

Figure 8:
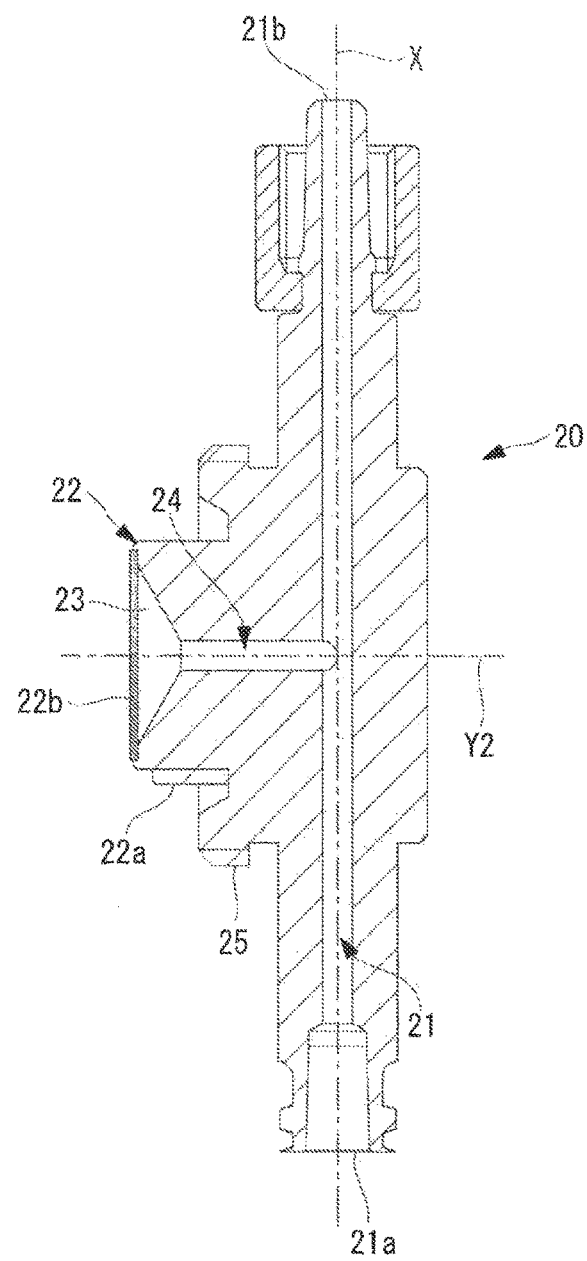
FIG. 8 is a vertical cross-sectional view of a flow passage unit shown in FIG. 4.

As shown in FIG. 8, the flow passage unit 20 includes the flow passage 21 that allows fluid to be passed through in the flow direction extending along the axis X, from the inlet 21a to the outlet 21b, an introduction flow passage 24 that extends in a second axis direction along an axis Y2 orthogonal to the axis X and guides the fluid from the flow passage 21 to a fluid chamber 23, and a protrusion 22 that has a diaphragm 22b (a pressure transmitting surface) arranged on its top and a positioning projection 22a (a second positioning portion) formed on its outer circumferential surface.

As shown in FIG. 8, the diaphragm 22b is arranged on a plane orthogonal to the axis Y2. Accordingly, the positioning projection 22a is formed on the outer circumferential surface of the protrusion 22 such that the positioning projection 22a extends in the second axis direction along the axis Y2, which is orthogonal to the diaphragm 22b.

The diaphragm 22b is made of a corrosion-resistant material (e.g., a silicone resin material) and formed in a thin film. The diaphragm 22b has, in a plan view, a circular shape with its central axis extending along the axis Y2 and has an outer peripheral portion bonded or welded to a tip of the protrusion 22. This prevents fluid introduced into the fluid chamber 23 from flowing out of the fluid chamber 23. The diaphragm 22b, which is formed in a thin film, is deformed by a pressure of the fluid introduced into the fluid chamber 23.

As shown in FIG. 4, the diaphragm 22b of the flow passage unit 20 is in contact with the diaphragm 12a of the pressure detecting unit 10 when the flow passage unit 20 is mounted on the pressure detecting unit 10. Thus, the diaphragm 22b serves as a pressure transmitting surface for transmitting the pressure of fluid passing through the flow passage 21, to the diaphragm 12a.

Figure 9:
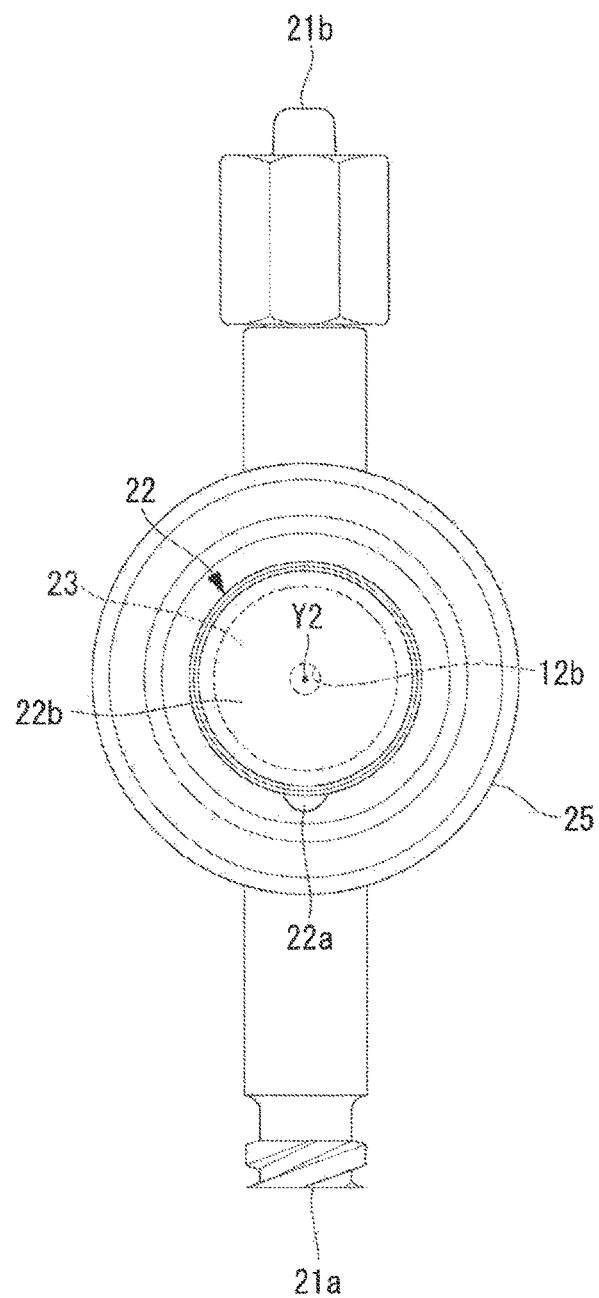
FIG. 9 is a back view of the flow passage unit shown in FIG. 8.

FIG. 9 is a back view of the flow passage unit 20 in FIG. 8, and shows the flow passage unit 20 as seen from the left in FIG. 8.

As shown in FIG. 9, the positioning projection 22a on the outer circumferential surface of the protrusion 22 is formed at only one location about the axis Y2.

Next, a description will be given to the mounting of the flow passage unit 20 onto the pressure detecting unit 10 in a manner that arranges the inlet 21a and the outlet 21b of the flow passages 21 in the flow passage unit 20 at a predetermined position relative to the pressure detecting unit 10.

As shown in FIG. 6, the positioning groove 11a on the inner circumferential surface of the recess 11 is formed at only one location about the axis Y1. Also, as shown in FIG. 9, the positioning projection 22a on the outer circumferential surface of the protrusion 22 is formed at only one location about the axis Y2.

As shown in FIG. 4, the flow passage unit 20 is mounted on the pressure detecting unit 10 with the protrusion 22 fitted inside the recess 11 whose inner diameter is slightly larger than an outer diameter of the protrusion 22.

As a result, the protrusion 22 cannot be inserted into the recess 11 unless the axis Y1, the central axis of the pressure detecting unit 10, coincides with the axis Y2, the central axis of the flow passage unit 20 and the position of the positioning groove 11a about the axis Y1 coincides with the position of the positioning projection 22a about the axis Y2.

The pressure detecting device 100 of the embodiment is therefore configured such that the flow passage unit 20 can be mounted onto the pressure detecting unit 10 when the axis Y1, the central axis of the pressure detecting unit 10, coincides with the axis Y2, the central axis of the flow passage unit 20, and the position of the positioning groove 11a about the axis Y1 coincides with the position of the positioning projection 22a about the axis Y2.

The operator mounts the flow passage unit 20 onto the pressure detecting unit 10 mounted on the installation plate S, following the procedure below.

Figure 10:
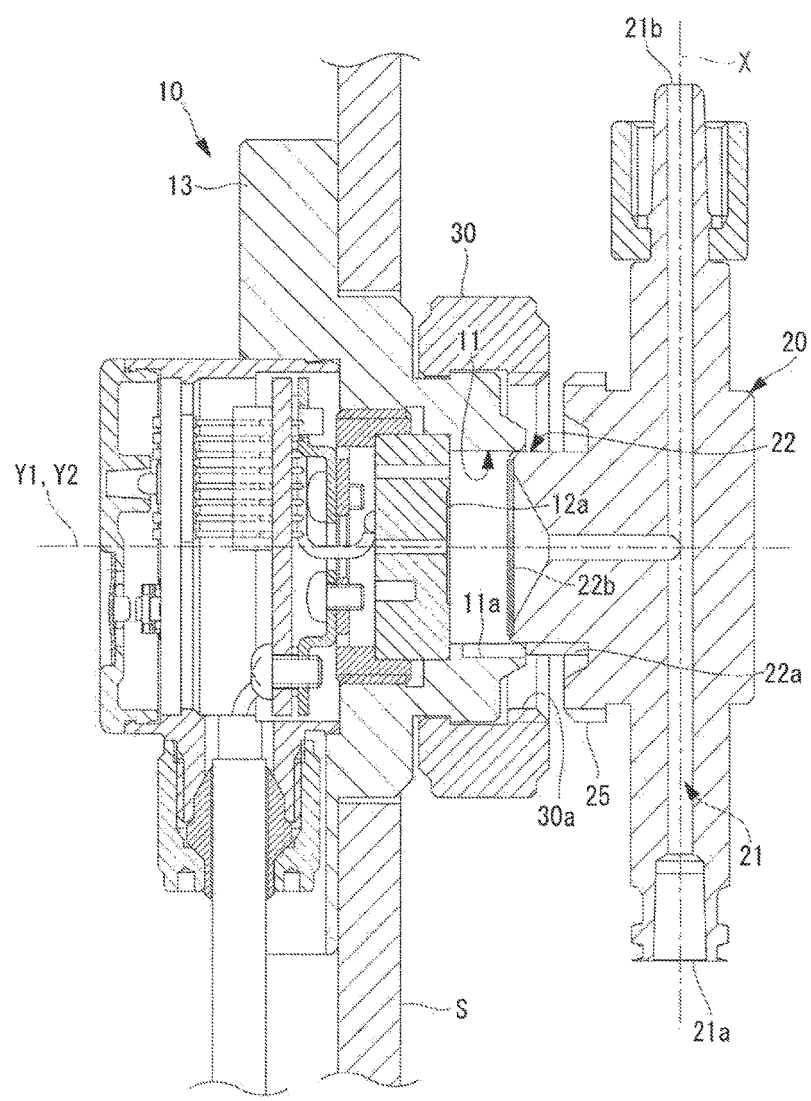
FIG. 10 is a vertical cross-sectional view of the pressure detecting device illustrating insertion of a projecting protrusion of the flow passage unit into a recess of the pressure detecting unit.

First, as shown in FIG. 10, the flow passage unit 20 is placed such that the axis Y1, the central axis of the pressure detecting unit 10, coincides with the axis Y2, the central axis of the flow passage unit 20, and the position of the positioning groove 11a about the axis Y1 coincides with the position of the positioning projection 22a about the axis Y2.

FIG. 10 illustrates the insertion of the protrusion 22 of the flow passage unit 20 into the recess 11 of the pressure detecting unit 10.

As shown in FIG. 10, the diaphragm 12a arranged at the bottom of the recess 11 and the diaphragm 22b arranged at the top of the protrusion 22 are not in contact with each other but spaced apart at this point.

Figure 11:
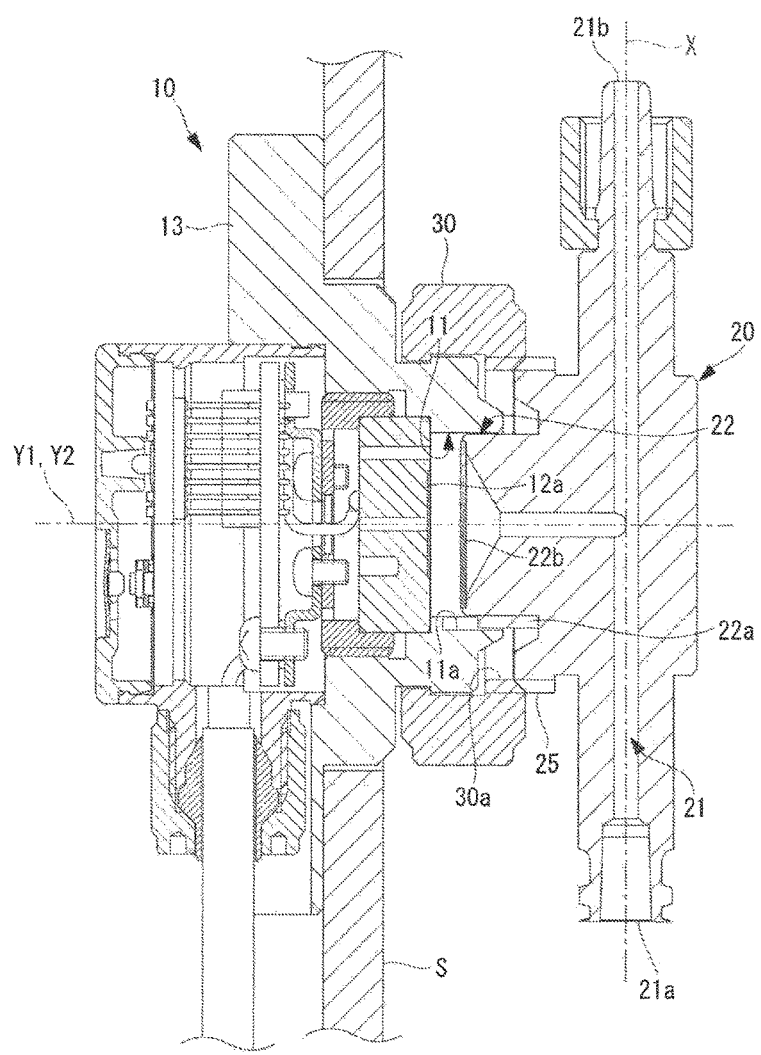
FIG. 11 is a vertical cross-sectional view of the pressure detecting device illustrating a distal end of internal threads on the nut being in contact with a distal end of external threads on the flow passage unit.

The operator brings the flow passage unit 20 closer to the pressure detecting unit 10 from the state in FIG. 10, moving the flow passage unit 20 into the position illustrated in FIG. 11.

In the state shown in FIG. 11, a distal end side region of the positioning groove 11a engages a distal end side region of the positioning projection 22a.

In the state shown in FIG. 11, a distal end of the internal threads 30a formed on the inner circumferential surface of the nut 30 are in contact with a distal end of the external threads 25 formed on an outer circumferential surface of the flow passage unit 20.

In this way, the distal end of the internal threads 30a in the axis Y1 direction is in contact with the distal end of the external threads 25 in the axis Y2 direction when a partial region of the positioning groove 11a in the axis Y1 direction engages a partial region of the positioning projection 22a in the axis Y2 direction.

As a result, the internal threads 30a and the external threads 25 start fastening to each other with the inlet 21a and the outlet 21b of the flow passage 21 in the flow passage unit 20 arranged at the predetermined position relative to the pressure detecting unit 10.

In the state shown in FIG. 11, the internal threads 30a are in contact with the external threads 25. Thus, a force applied to the flow passage unit 20, by the operator holding the unit 20, toward the pressure detecting unit 10 cannot further bring the flow passage unit 20 closer to the pressure detecting unit 10.

At this point, the diaphragm 12a arranged at the bottom of the recess 11 and the diaphragm 22b arranged at the top of the protrusion 22 are not in contact with each other but spaced apart, as shown in FIG. 11.

In this way, in the pressure detecting device 100 of the embodiment, a force applied to the flow passage unit 20, by the operator holding the unit 20, toward the pressure detecting unit 10 will not cause the diaphragm 12a and the diaphragm 22b to contact with each other. This prevents the diaphragm 12a and the diaphragm 22b from undesirably touching each other to be damaged due to carelessness of the operator.

Next, the operator fastens the internal threads 30a of the nut 30 to the external threads 25 of the flow passage unit 20 by rotating the nut 30 in a fastening direction (a direction shown by "LOCK" in FIG. 1) about the axis Y1 while holding the flow passage unit 20 in the state shown in FIG. 11.

As the internal threads 30a of the nut 30 are fastened to the external threads 25 of the flow passage unit 20, the diaphragm 22b gradually moves closer to and finally comes into contact with the diaphragm 12a, achieving the state illustrated in FIG. 4.

In the state shown in FIG. 11, the distal end side region of the positioning groove 11a engages the distal end side region of the positioning projection 22a.

Accordingly, even if the nut 30 is rotated about the axis Y1, the flow passage unit 20 is not rotated about the axis Y2 and kept at the position about the axis Y2.

In this way, the flow passage unit 20 is mounted onto the pressure detecting unit 10 without bringing the diaphragm 12a and the diaphragm 22b into contact with each other inadvertently or rotating the flow passage unit 20 about the axis Y2.

The procedure for mounting an unused flow passage unit 20 to the pressure detecting unit 10 has been described in the foregoing. The reverse procedure is followed for removing a used flow passage unit 20 from the pressure detecting unit 10.

The operation unfastens the internal threads 30a of the nut 30 from the external threads 25 of the flow passage unit 20 by rotating the nut 30 in an unfastening direction (a direction shown by "UNLOCK" in FIG. 1) about the axis Y1 while holding the flow passage unit 20 in the state shown in FIG. 4.

Next, a protective cap 19 to be inserted into the recess 11 of the pressure detecting unit 10 will be described.

As shown in FIG. 5, the diaphragm 12a of the pressure sensor 12 is exposed to the outside when the flow passage unit 20 is not mounted on the pressure detecting unit 10 of the embodiment.

Figure 12:
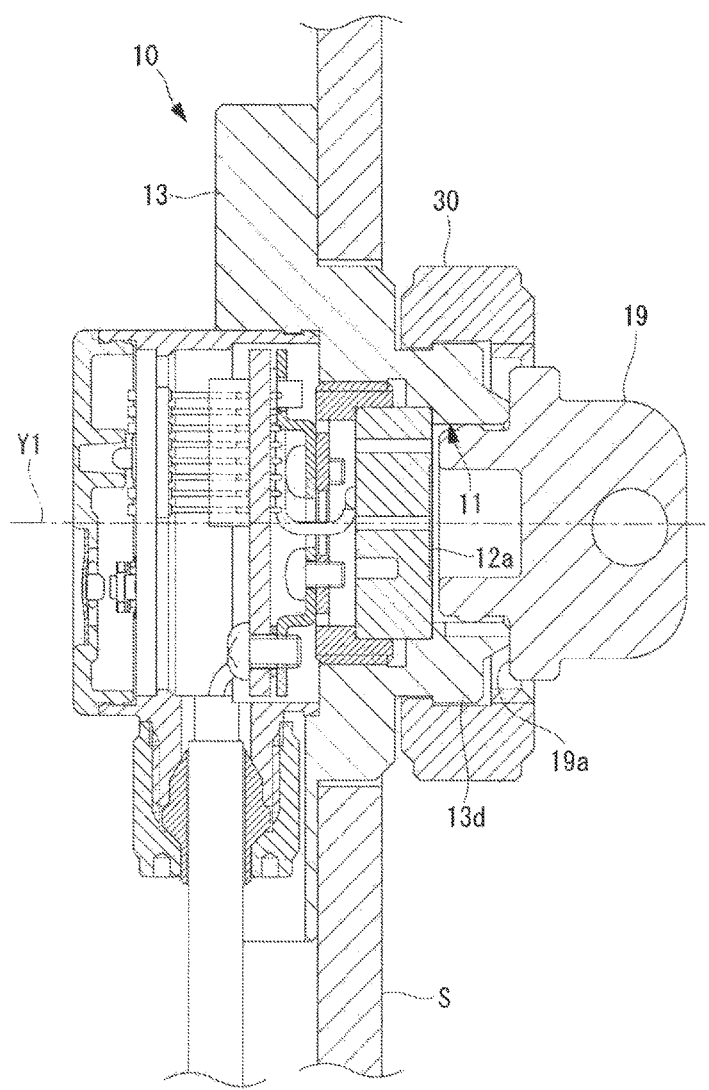
FIG. 12 is a vertical cross-sectional view of the pressure detecting unit shown in FIG. 5 with a protective cap attached to the unit.

The protective cap 19 shown in FIG. 12 protects the diaphragm 12a of the pressure sensor 12 from exposure to the outside even when the flow passage unit 20 is not mounted on the pressure detecting unit 10.

As shown in FIG. 12, the protective cap 19 is shaped to block the recess 11 of the pressure detecting unit 10. The protective cap 19 has an abutment surface 19a that comes into contact with a tip position of the front end portion 13d of the pressure detecting unit 10. As a result, the abutment surface 19a limits further movement of the protective cap 19 toward the pressure detecting unit 10 when the abutment surface 19a is in contact with the tip position of the front end portion 13d of the pressure detecting unit 10 as shown in FIG. 12.

As shown in FIG. 12, a tip of the protective cap 19 is spaced apart from the diaphragm 12a of the pressure detecting unit 10 when the abutment surface 19a is in contact with the tip position of the front end portion 13d of the pressure detecting unit 10.

Thus, the protective cap 19 will not contact with the diaphragm 12a even when the cap 19 is inserted into the recess 11.

As described above, the pressure detecting unit 10 of the embodiment is configured such that the diaphragm 12a of the pressure sensor 12 is protected from exposure to the outside by the protective cap 19 fitted inside the recess 11.

Next, a protective cap 27 to be attached to the protrusion 22 of the flow passage unit 20 will be described.

As shown in FIG. 8, the diaphragm 22b of the flow passage unit 20 of the embodiment is exposed to the outside when the flow passage unit 20 is not mounted on the pressure detecting unit 10.

Figure 13:
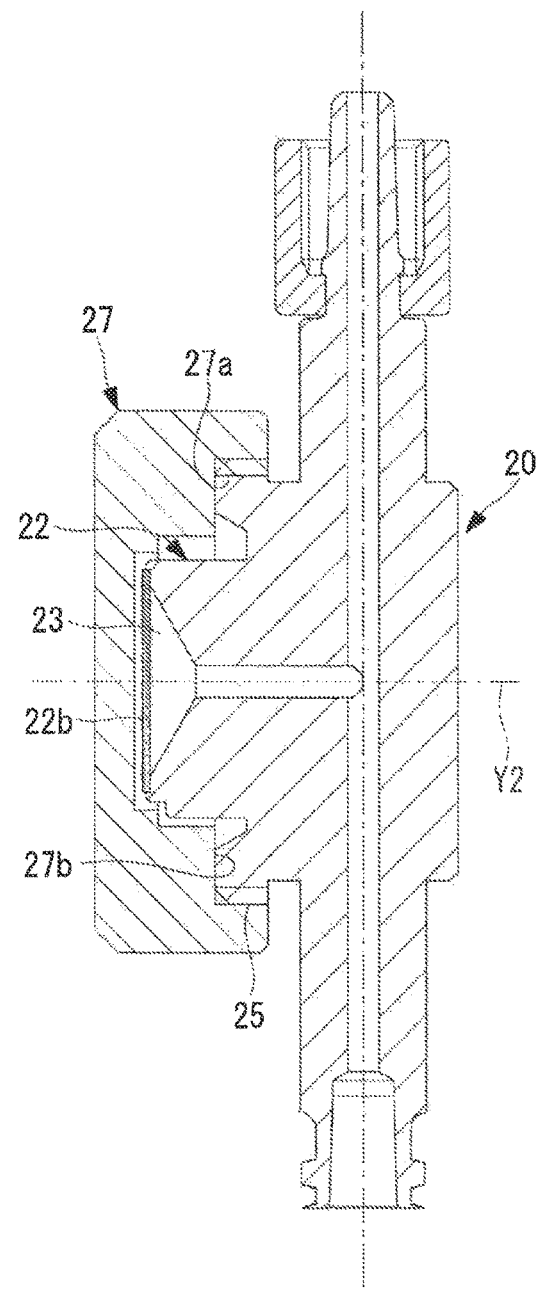
FIG. 13 is a vertical cross-sectional view of the flow passage unit shown in FIG. 6 with a protective cap attached to the unit.

The protective cap 27 shown in FIG. 13 protects the diaphragm 22b of the flow passage unit 20 from exposure to the outside even when the flow passage unit 20 is not mounted on the pressure detecting unit 10.

As shown in FIG. 13, the protective cap 27 has on its inner circumferential surface internal threads 27a to be fastened to the external threads 25 of the flow passage unit 20. The protective cap 27 is attached to the flow passage unit 20 by fastening the internal threads 27a of the protective cap 27 to the external threads 25 of the flow passage unit 20.

As shown in FIG. 13, the protective cap 27 is shaped to cover the protrusion 22 of the flow passage unit 20. The protective cap 27 has an abutment surface 27b that comes into contact with the flow passage unit 20. As a result, the abutment surface 27b limits further movement of the protective cap 27 toward the flow passage unit 20 when the abutment surface 27b is in contact with the flow passage unit 20 as shown in FIG. 13.

As shown in FIG. 13, the protective cap 27 is spaced apart from the diaphragm 22b of the flow passage unit 20 when the abutment surface 27b is in contact with the flow passage unit 20.

Thus, the protective cap 27 will not contact with the diaphragm 22b even when the cap 27 is attached to the protrusion 22.

As described above, the flow passage unit 20 of the embodiment is configured such that the diaphragm 22b is protected from exposure to the outside by the protective cap 27 attached to the protrusion 22.

Figure 14:
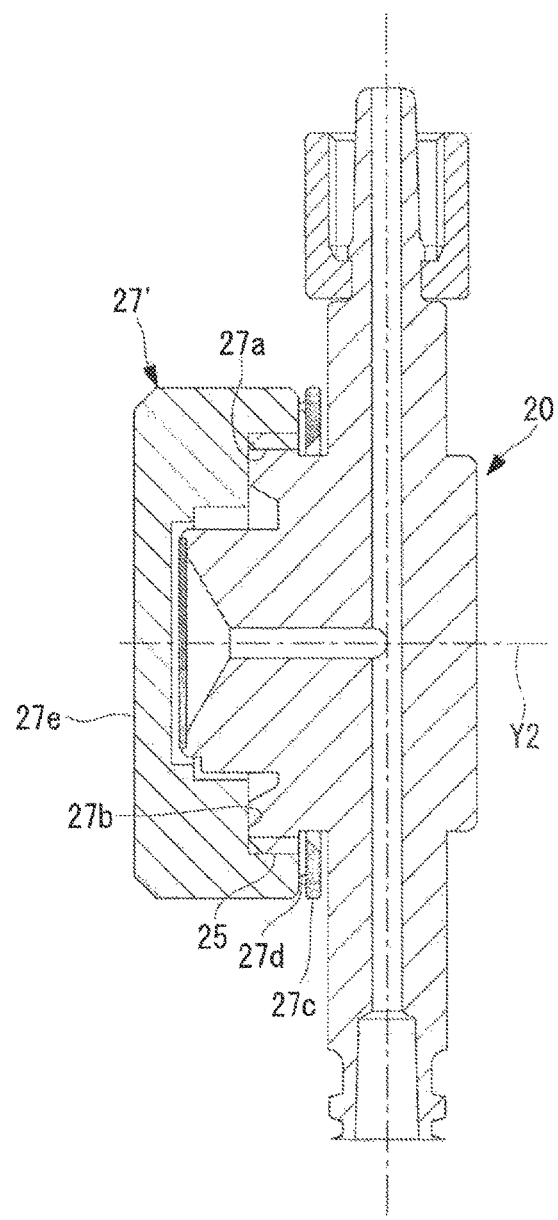
FIG. 14 is a vertical cross-sectional view of the flow passage unit shown in FIG. 6 with a modification of the protective cap attached to the unit.

FIG. 14 illustrates a protective cap 27', a modification of the protective cap 27 in FIG. 13.

The modified protective cap 27' in FIG. 14 has a cap body 27e, a lower cap 27c arranged below the external threads 25 of the flow passage unit 20, a coupling member 27d that couples the lower cap 27c to the cap body 27e.

Movement of the modified protective cap 27' along the axis Y2 is restricted by the external threads 25 of the flow passage unit 20 at the lower cap 27c. Accordingly, rotation of the cap body 27e about the axis Y2 produces a force to break the coupling member 27d. When the cap body 27e is rotated about the axis Y2 to break the coupling member 27d and then the cap body 27e is decoupled from the lower cap 27c, the cap body 27e is removed from the flow passage unit 20 while the lower cap 27c remains attached to the flow passage unit 20.

According to the modified protective cap 27', the operator can be easily aware whether the flow passage unit 20 has been used or unused because the lower cap 27c remains attached to the flow passage unit 20 from which the cap body 27e has been removed.

A description will be given to the operation and effect of the pressure detecting device 100 of the embodiment described above.

According to the pressure detecting device 100 of the embodiment, the flow passage unit 20 is removably mounted on the pressure detecting unit 10. Thus, in changing a fluid to be passed through the flow passage 21, a used flow passage unit 20 can be removed from the pressure detecting unit 10 for mounting an unused flow passage unit 20 on the pressure detecting unit 10 anew.

The removability of the flow passage unit 20 eliminates, in changing a fluid to be passed through the flow passage 21, the need for the washing of the passage 21, which takes a great deal of time. This can increase the rapidity of the operation. In addition, the use of the unused flow passage unit 20 increases the safety.

The nut 30 mounts the flow passage unit 20 onto the pressure detecting unit 10 when the axis Y1 coincides with the axis Y2 and the position of the positioning groove 11a of the pressure detecting unit 10 about the axis Y1 coincides with the position of the positioning projection 22a of the flow passage unit 20 about the axis Y2. Accordingly, the flow passage unit 20 is arranged in a predetermined orientation about the axis Y2 relative to the orientation of the pressure detecting unit 10 about the axis Y1.

In this way, the inlet 21a and the outlet 21b of the flow passage 21 formed in the flow passage unit 20 are arranged at the predetermined positions relative to the pressure detecting unit 10, thereby increasing connectivity with a tube to be connected to the inlet 21a and a tube to be connected to the outlet 21b.

Thus, according to the pressure detecting device 100 of the embodiment, there is provided a pressure detecting device 100 that improves connectivity with tubes to be connected to the inlet 21a and the outlet 21b of the flow passage 21, while increasing the rapidity of the operation of changing a fluid to be passed through the flow passage 21 and also increasing the safety.

The pressure detecting device 100 of the embodiment is configured such that the pressure detecting unit 10 has the recess 11 with the diaphragm 12a arranged at the bottom, the flow passage unit 20 has the protrusion 22 with the diaphragm 22b arranged at the top, and the nut 30 mounts the flow passage unit 20 onto the pressure detecting unit 10 with the protrusion 22 fitted inside the recess 11.

The arrangement of the diaphragm 12a at the bottom of the recess 11 of the pressure detecting unit 10 inhibits the operator from accidentally touching the diaphragm 12a in replacing the flow passage unit 20 or inhibits the diaphragm 12a from undesirably contacting with other members to be damaged.

According to the pressure detecting device 100 of the embodiment, as the operator rotates the nut 30 mounted on the pressure detecting unit 10 about the axis Y1, the diaphragm 12a of the pressure detecting unit 10 and the diaphragm 22b of the flow passage unit 20 are brought closer to each other, and finally, into contact with each other. With the relatively simple operation of rotating the nut 30 about the axis Y1, the space between the diaphragm 12a and the diaphragm 22b can be gradually narrowed and then these surfaces are reliably brought into contact with each other. This brings the diaphragm 12a and the diaphragm 22b into contact relatively easily and will not strongly bring these surfaces into contact with each other to damage the surfaces.

According to the pressure detecting device 100 of the embodiment, the flow passage unit 20 is positioned such that it is arranged in the predetermined orientation about the axis Y2 relative to the orientation of the pressure detecting unit 10 about the axis Y1, before the nut 30 is rotated about the axis Y1 to mount the flow passage unit 20 onto the pressure detecting unit 10. As a result, the flow passage unit 20 can be easily mounted onto the pressure detecting unit 10 compared with the case where the positioning groove 11a starts to engage the positioning projection 22a simultaneously with or subsequently to the fastening of the nut 30 to the flow passage unit 20.

Second Embodiment

Next, a pressure detecting device according to second embodiment of the present disclosure will be described with reference to the drawings.

The second embodiment is a modification of the first embodiment, and is similar to the first embodiment unless otherwise described hereinafter.

The pressure detecting device of the first embodiment has the positioning groove 11a at only one location on the inner circumferential surface of the recess 11, and the positioning projection 22a at only one location on the outer circumferential surface of the protrusion 22.

In contrast, the pressure detecting device of the second embodiment has positioning grooves at a plurality of locations on the inner circumferential surface of the recess 11, and positioning projections at a plurality of locations on the outer circumferential surface of the protrusion 22.

In this embodiment, the pressure detecting device has two kinds of pressure detecting devices including a first pressure detecting device and a second pressure detecting device.

Figure 15A:
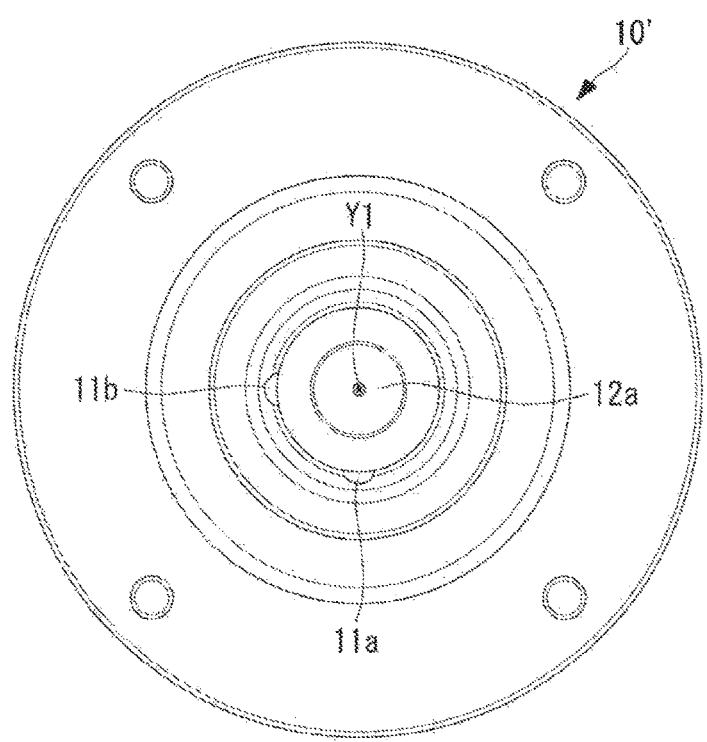
FIG. 15A shows front elevations of a first pressure detecting unit provided in a pressure detecting device according to a second embodiment.
Figure 16A:
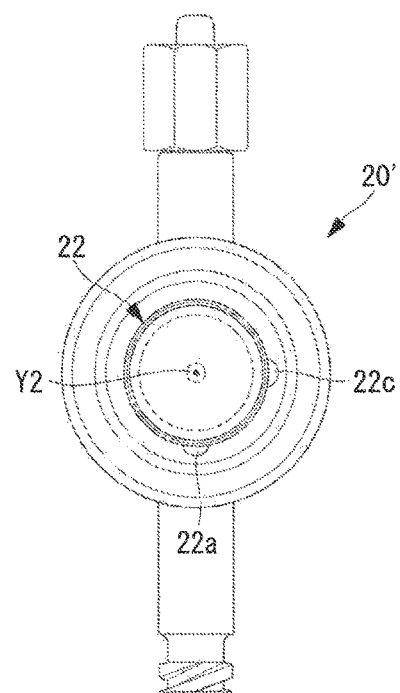
FIG. 16A shows back elevations of a first flow passage unit provided in the pressure detecting device according to the second embodiment.

The first pressure detecting device is a combination of a first pressure detecting unit 10' illustrated in FIG. 15A and a first flow passage unit 20' illustrated in FIG. 16A.

Figure 15B:
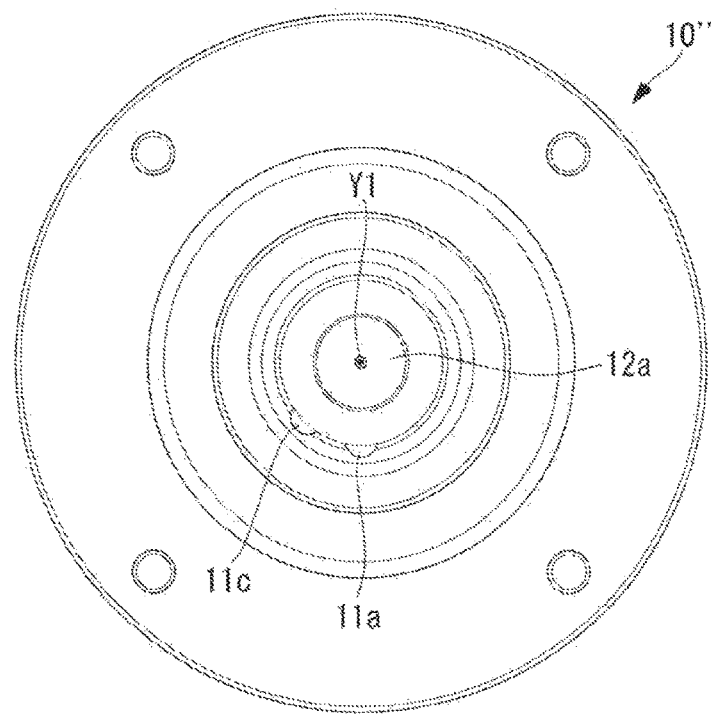
FIG. 15B shows front elevations of a second pressure detecting unit provided in a pressure detecting device according to a second embodiment.
Figure 16B:
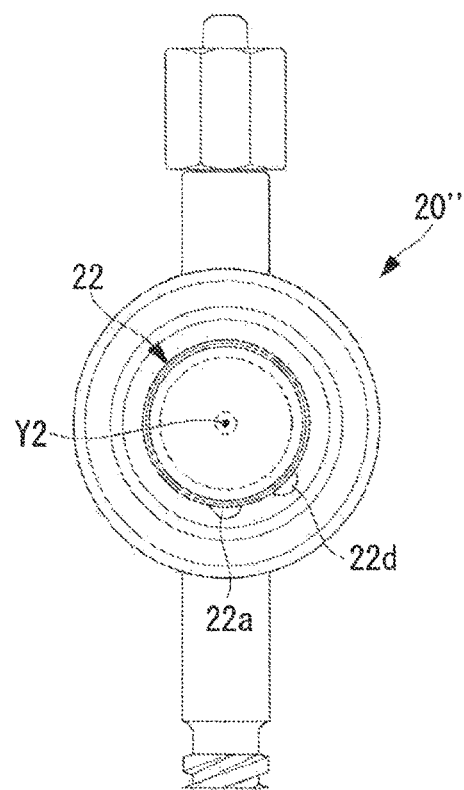
FIG. 16B shows back elevations of a second flow passage unit provided in the pressure detecting device according to the second embodiment.

On the other hand, the second pressure detecting device is a combination of a second pressure detecting unit 10" illustrated in FIG. 15B and a second flow passage unit 20" illustrated in FIG. 16B.

These two kinds of pressure detecting devices, the first pressure detecting device and the second pressure detecting device, detect pressures of different kinds of fluids, for example. It is therefore desirable to prevent incorrect placement of mounting the second flow passage unit 20″ on the first pressure detecting unit 10′ or mounting the first flow passage unit 20′ on the second pressure detecting unit 10″.

Thus, in the present embodiment, the first pressure detecting unit 10′ and the second pressure detecting unit 10″ each has a plurality of positioning grooves, and positions of the positioning grooves about the axis Y1 are differentiated between the first pressure detecting unit 10′ and the second pressure detecting unit 10″.

As shown in FIG. 15A, the first pressure detecting unit 10′ has a positioning groove 11*b* at a location rotated 90 degrees from the positioning groove 11*a* around the axis Y1. On the other hand, as shown in FIG. 15B, the second pressure detecting unit 10″ has a positioning groove 11*c* at a location rotated 45 degrees from the positioning groove 11*a* around the axis Y1.

Accordingly, in this embodiment, the protrusion 22 of the first flow passage unit 20′ is inserted into the recess 11 of the first pressure detecting unit 10′ when the axis Y1 coincides with the axis Y2 and the positions of the positioning grooves 11*a* and 11*b* about the axis Y1 respectively coincide with the positions of the positioning projections 22*a* and 22*c* about the axis Y2.

The nut 30 mounts the first flow passage unit 20′ onto the first pressure detecting unit 10′, with the protrusion 22 fitted inside the recess 11.

The protrusion 22 of the second flow passage unit 20″ is inserted into the recess 11 of the second pressure detecting unit 10″ when the axis Y1 coincides with the axis Y2 and the positions of the positioning grooves 11*a* and 11*c* about the axis Y1 respectively coincide with the positions of the positioning projections 22*a* and 22*d* about the axis Y2.

The nut 30 mounts the second flow passage unit 20″ onto the second pressure detecting unit 10″, with the protrusion 22 fitted inside the recess 11.

As in the foregoing, in this embodiment, the first flow passage unit 20′ and the second flow passage unit 20″ each has the plurality of positioning projections and the positions of the positioning projections about the axis Y2 are differentiated between the first flow passage unit 20′ and the second flow passage unit 20″.

As shown in FIG. 16A, the first flow passage unit 20′ has a positioning projection 22*c* at a location rotated 90 degrees from the positioning projection 22*a* around the axis Y2. On the other hand, as shown in FIG. 16B, the second flow passage unit 20″ has a positioning projection 22*d* at a location rotated 45 degrees from the positioning projection 22*a* around the axis Y2.

In this way, the positional relationship between the positioning grooves 11*a* and 11*b* of the first pressure detecting unit 10′ is different from the positional relationship between the positioning projections 22*a* and 22*d* of the second flow passage unit 20″. This prevents the incorrect placement of mounting the second flow passage unit 20″ on the first pressure detecting unit 10′.

Similarly, the positional relationship between the positioning grooves 11*a* and 11*c* of the second pressure detecting unit 10″ is different from the positional relationship between the positioning projections 22*a* and 22*c* of the first flow passage unit 20′. This prevents the incorrect placement of mounting the first flow passage unit 20′ on the second pressure detecting unit 10″.

As in the foregoing, according to this embodiment, when the positions, about the axis Y1, of the plurality of positioning grooves formed on the inner circumferential surface of the recess 11 of the pressure detecting unit 10′ or 10″ do not coincide with the positions, about the axis Y2, of the plurality of positioning projections formed on the protrusion 22 of the flow passage unit 20′ or 20″, the flow passage unit is prevented from being mounted onto the pressure detecting unit. This prevents incorrect placement of a flow passage unit on a pressure detecting unit that does not correspond to the flow passage unit in a situation where, for example, a plurality of flow passage units 20′ and 20″ are mounted onto the respective pressure detecting units 10′ and 10″.

Other Embodiments

While in the above description, the pressure detecting unit has the positioning grooves 11*a*, 11*b*, and 11*c* on the inner circumferential surface of the recess 11 of the pressure detecting unit and the flow passage unit has the positioning projections 22*a*, 22*c*, and 22*d* on the outer circumferential surface of the protrusion 22 of the flow passage unit, the present invention may be configured otherwise.

For example, the pressure detecting unit may have a positioning projection on the inner circumferential surface of the recess 11, and the flow passage unit may have a positioning groove on the outer circumferential surface of the protrusion 22 of the flow passage unit. That is, a positioning projection and a positioning groove may be respectively formed instead of the positioning groove and the positioning projection in the above description.

The invention claimed is:

1. A pressure detecting device comprising:
    a pressure detecting unit configured to detect a pressure transmitted to a pressure detecting surface;
    a flow passage unit including a flow passage allowing a fluid to be passed therethrough along a flow direction, from an inlet to an outlet, and a pressure transmitting surface for transmitting a pressure of the fluid flowing through the flow passage, to the pressure detecting surface; and
    a mounting mechanism configured to removably mount the flow passage unit onto the pressure detecting unit,
    wherein the pressure detecting unit includes a first positioning portion extending in a first axis direction along a first axis orthogonal to the pressure detecting surface,
    the pressure detecting unit includes a recess that has the pressure detecting surface arranged at a bottom thereof and the first positioning portion formed on an inner circumferential surface thereof,
    the flow passage unit includes a second positioning portion extending in a second axis direction along a second axis orthogonal to the pressure transmitting surface,
    the flow passage unit includes a protrusion that has the pressure transmitting surface arranged at a top thereof and the second positioning portion formed on an outer circumferential surface thereof, and
    the mounting mechanism mounts the flow passage unit onto the pressure detecting unit, with the protrusion of the flow passage unit fitted inside the recess of the pressure detecting unit when the first axis coincides with the second axis and a position of the first positioning portion about the first axis coincides with a position of the second positioning portion about the second axis.

2. The pressure detecting device according to claim 1, wherein
    the first positioning portion includes a plurality of grooves formed on the inner circumferential surface of the recess, the second positioning portion includes a plurality of projections formed on the outer circumferential surface of the protrusion, and the mounting mechanism mounts the flow passage unit onto the pressure detecting unit when the first axis coincides with the second axis and positions of the plurality of grooves about the first axis respectively coincide with positions of the plurality of projections about the second axis.

3. The pressure detecting device according to claim 1, wherein the mounting mechanism is a nut that is mounted on the pressure detecting unit such that the mounting mechanism is rotatable about the first axis and has internal threads on an inner circumferential surface thereof, the flow passage unit has external threads on an outer circumferential surface that is outward of an outer periphery of the protrusion, and the pressure transmitting surface is brought into contact with the pressure detecting surface by fastening the internal threads formed on the nut to the external threads.

4. The pressure detecting device according to claim 2, wherein the mounting mechanism is a nut that is mounted on the pressure detecting unit such that the mounting mechanism is rotatable about the first axis and has internal threads on an inner circumferential surface thereof, the flow passage unit has external threads on an outer circumferential surface that is outward of an outer periphery of the protrusion, and the pressure transmitting surface is brought into contact with the pressure detecting surface by fastening the internal threads formed on the nut to the external threads.

5. The pressure detecting device according to claim 3, wherein a distal end of the internal threads in the first axis direction is in contact with a distal end of the external threads in the second axis direction when a part of a length of the first positioning portion in the first axis direction engages a part of a length of the second positioning portion in the second axis direction.

6. The pressure detecting device according to claim 4, wherein a distal end of the internal threads in the first axis direction is in contact with a distal end of the external threads in the second axis direction when a part of a length of the first positioning portion in the first axis direction engages a part of a length of the second positioning portion in the second axis direction.

\* \* \* \* \*